(12) United States Patent
Shiotani

(10) Patent No.: US 11,985,278 B2
(45) Date of Patent: May 14, 2024

(54) NON-TRANSITORY COMPUTER-READABLE RECORDING MEDIUM STORING COMPUTER-READABLE INSTRUCTIONS FOR TERMINAL DEVICE FOR DISPLAYING AN OBJECT, TERMINAL DEVICE FOR DISPLAYING AN OBJECT, AND METHOD FOR CONTROLLING TERMINAL DEVICE FOR DISPLAYING AN OBJECT

(71) Applicant: BROTHER KOGYO KABUSHIKI KAISHA, Nagoya (JP)

(72) Inventor: Takeshi Shiotani, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 18/145,897

(22) Filed: Dec. 23, 2022

(65) Prior Publication Data
US 2023/0208988 A1 Jun. 29, 2023

(30) Foreign Application Priority Data

Dec. 27, 2021 (JP) .................. 2021-212915

(51) Int. Cl.
*H04N 1/00* (2006.01)
*G06F 3/12* (2006.01)

(52) U.S. Cl.
CPC ....... *H04N 1/00427* (2013.01); *G06F 3/1203* (2013.01); *G06F 3/1232* (2013.01)

(58) Field of Classification Search
CPC ............ H04N 1/00427; H04N 1/00477; G06F 3/1203; G06F 3/1232; G06F 3/1229; G06F 3/1236
See application file for complete search history.

(56) References Cited

U.S. PATENT DOCUMENTS

| 2017/0094104 | A1  | 3/2017  | Fujiwara |
| 2019/0332335 | A1* | 10/2019 | Watanabe ............. G06F 3/1231 |
| 2020/0150907 | A1* | 5/2020  | Costa Majo .......... G06F 3/1208 |
| 2021/0271433 | A1  | 9/2021  | Hirai |
| 2023/0007141 | A1* | 1/2023  | Tanaka ................ G06F 16/9554 |
| 2023/0146770 | A1* | 5/2023  | Yamazaki ................ G06F 8/61 717/121 |

FOREIGN PATENT DOCUMENTS

| JP | 2000069216 A | 3/2000 |
| JP | 2017068574 A | 4/2017 |
| JP | 2021141365 A | 9/2021 |

* cited by examiner

*Primary Examiner* — Iriana Cruz

(74) *Attorney, Agent, or Firm* — Scully, Scott, Murphy & Presser, PC

(57) ABSTRACT

A terminal device may receive first device identification information identifying a first communication device from a first communication device and send the first device identification information to a management server. The terminal device may receive first display related information associated with the first device identification information from the management server and receive the notification information from a notification server. The terminal device may, in a case where the first display related information indicates a predetermined information, display an object on a display, the object being for displaying the notification information, and in a case where the first display related information does not indicate the predetermined information, not display the object on the display.

22 Claims, 11 Drawing Sheets

<Example of Home Screen Displayed in S24 of FIG. 5>

<Example of Home Screen Displayed in S32 of FIG. 5>

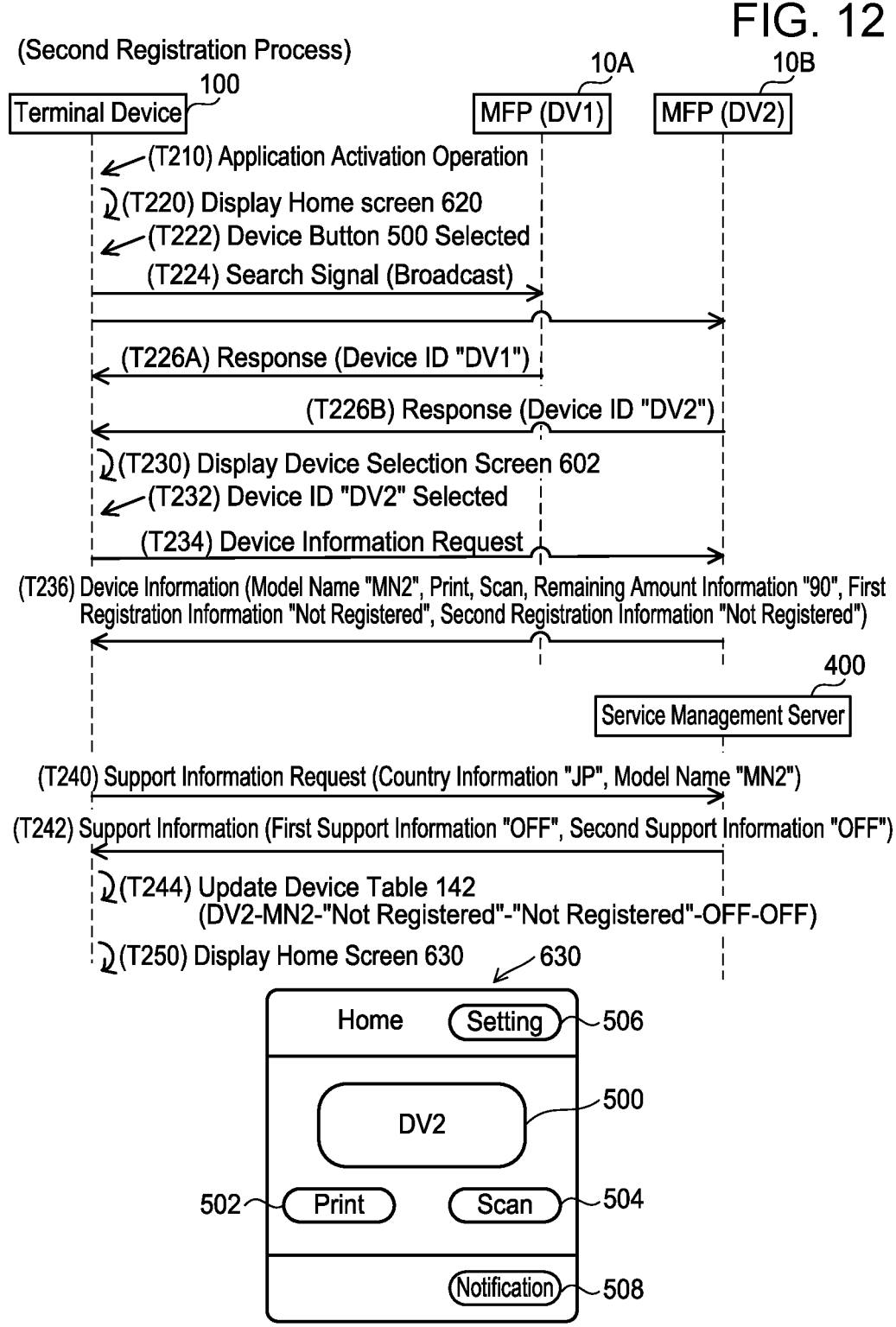

NON-TRANSITORY COMPUTER-READABLE RECORDING MEDIUM STORING COMPUTER-READABLE INSTRUCTIONS FOR TERMINAL DEVICE FOR DISPLAYING AN OBJECT, TERMINAL DEVICE FOR DISPLAYING AN OBJECT, AND METHOD FOR CONTROLLING TERMINAL DEVICE FOR DISPLAYING AN OBJECT

REFERENCE TO RELATED APPLICATIONS

This application claims priority from Japanese Patent Application No. 2021-212915 filed on Dec. 27, 2021. The entire content of the priority application is incorporated herein by reference.

BACKGROUND ART

A communication system including a cellphone, a printer and a push notification server is known. The cellphone sends acquisition request information for a push notification ID to the server, receives the push notification ID from the push notification server and sends the push notification ID to the printer. The printer sends the push notification ID to the push notification server. When the push notification server receives the push notification ID from the printer, the push notification server sends the push notification information to the cellphone. When the cellphone receives the push notification information from the push notification server, the cellphone displays a notification image.

DESCRIPTION

The present disclosure provides a technique which can enhance user convenience.

The disclosure discloses a non-transitory computer-readable recording medium storing computer-readable instructions for a terminal device. The terminal device may comprise: a processor; and a display. The computer-readable instructions, when executed by the processor, may cause the terminal device to: receive first device identification information identifying a first communication device from the first communication device; send the first device identification information to a management server, wherein the management server is configured to store, for each of one or more device identification information, the device identification information and display related information with each other, the display related information which is related to display of notification information; receive first display related information associated with the first device identification information from the management server, the first display related information being sent from the management server in response to the first device identification information being sent to the management server; receive the notification information from a notification server; in a case where the first display related information indicates a predetermined information, display an object on the display, the object being for displaying the notification information; and in a case where the first display related information does not indicate the predetermined information, not display the object on the display.

According to the above configuration, the terminal device receives the first device identification information from the first communication device, sends the first device identification information to a management server and receives the first display related information from the management server. In the case where the first display related information indicates the predetermined information, the terminal device displays the object for displaying the notification information and in the case where the first display related information does not indicate the predetermined information, the object is not displayed. As described above, depending on whether the first display related information indicates the predetermined information, whether to display the object for displaying the notification information can be changed. Accordingly, user convenience can be enhanced.

A computer-readable recording medium storing the above computer-readable instructions, a terminal device implemented by the above computer-readable instructions and a method for controlling the above terminal device are also novel and useful. A communication system comprising the above terminal device, the management server and the notification server is also novel and useful.

FIG. 12 illustrates a sequence diagram of a second registration process.

EMBODIMENT

Figure 1:
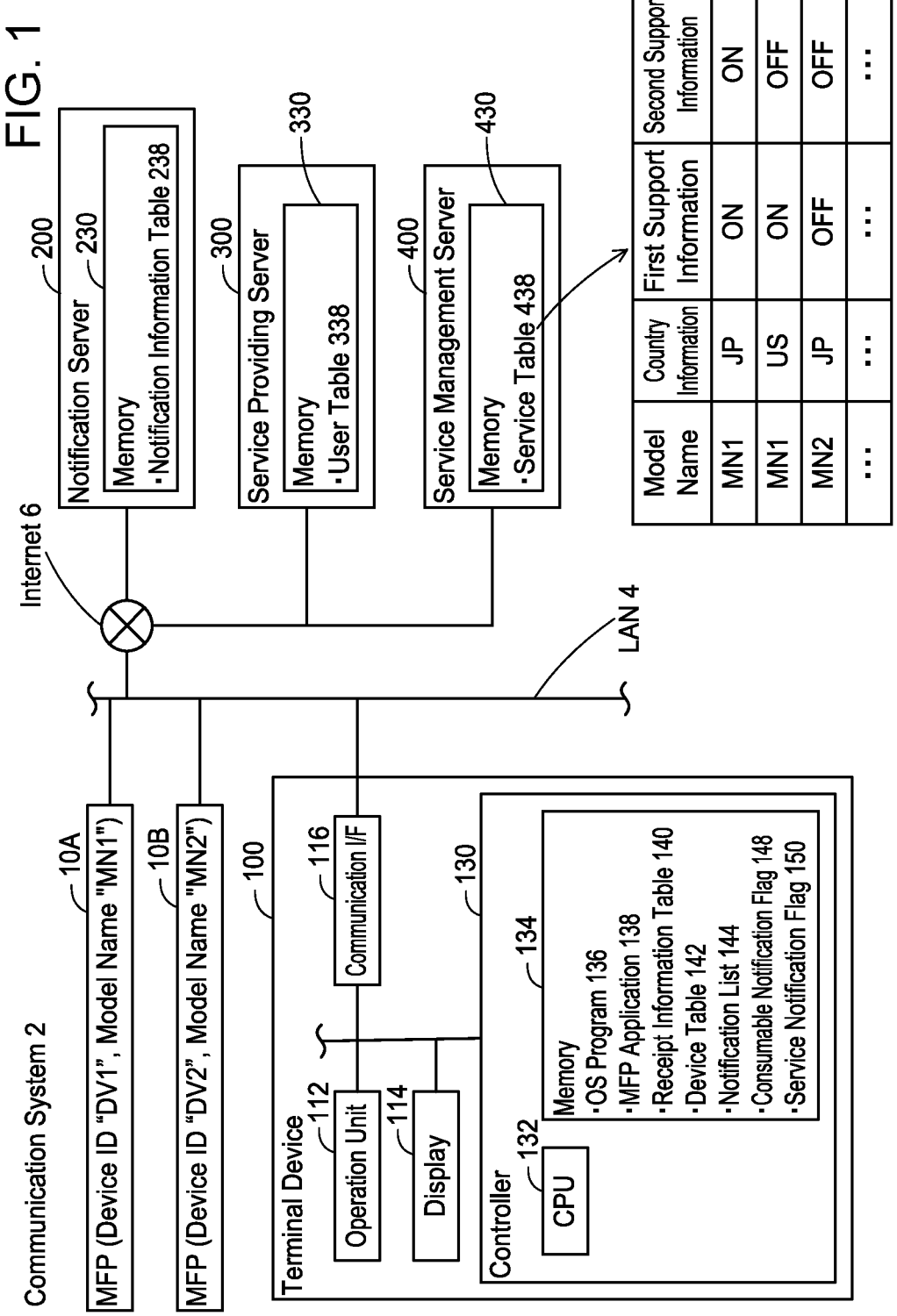
FIG. 1 illustrates a configuration of a communication system.

Configuration of Communication System 2; FIG. 1

As illustrated in FIG. 1, a communication system 2 includes a plurality of MFPs 10A, 10B, a terminal device 100, a notification server 200, a service providing server 300 and a service management server 400. The MFPs 10A, 10B and the terminal device 100 are connected to Local Area Network (LAN) 4. The MFPs 10A, 10B and the terminal device 100 are configured to communicate with each other via the LAN 4. The LAN 4 is connected to the Internet 6. The MFPs 10A,10B, the terminal device 100, the notification server 200, the service providing server 300 and the service management server 400 are connected to the Internet 6. The MFPs 10A, 10B, the terminal device 100, the notification server 200, the service providing server 300 and the service management server 400 are configured to communicate with each other via the Internet 6.

Configurations of MFPs 10A, 10B

The MFPs 10A, 10B are peripheral devices configured to execute a print function and a scan function (i.e., peripheral devices of a PC, etc.). The MFP 10A has a device name "DV1" and a model name "MN1". The MFP 10B has a device name "DV2" and a model name "MN2". The device name is a name given by an administrator of the MFPs to each of the MFPs 10A, 10B. The Model name is a name representing a model of each MFP. The MFPs 10A, 10B are manufactured by the same vendor. Hereafter, the MFP 10A and the MFP 10B may collectively be referred to as "MFP(s) 10".

Configuration of Terminal Device 100

The terminal device 100 is a portable terminal device such as a cell phone (e.g., a smartphone), a PDA or a tablet PC. The terminal device 100 includes an operation unit 112, a display 114, a communication interface 116 and a controller 130. Hereafter, the interface will be referred to as "I/F".

The operation unit 112 is for example a touch screen. The operation unit 112 is configured to accept various instructions. The display 114 displays various kinds of information. The display 114 may be a panel or a display device. The communication I/F 116 is connected to the LAN 4.

The controller 130 includes a CPU 132 and a memory 134. The CPU 132 executes various processes in accordance with an Operating System (OS) program 136 (hereafter simply be referred to as "OS 136") stored in the memory 134. The memory 134 further includes an MFP application 138 (hereafter simply be referred to as "app 138"), a receipt information table 140, a device table 142, a notification list 144, a consumable notification flag 148, and a service notification flag 150. The app 138 is a program to cause the MFPs 10A, 10B to execute the print function and the scan function. The notification list 144 is a list of pull notification information to be displayed. The consumable notification flag 148 indicates a value that is either "ON" indicating that a pull notification screen related to a consumable is allowed to pop up or "OFF" indicating that the pull notification screen related to a consumable is prohibited to pop up. The service notification flag 150 indicates a value that is either "ON" indicating that a pull notification screen related to a service provided by the service providing server 300 is allowed to pop up or "OFF" indicating that the pull notification screen related to this service is prohibited to pop up. The consumable notification flag 148 and the service notification flag 150 can be set by a user.

Configuration of Notification Server 200

The notification server 200 is provided on the Internet 6 by a provider different from the vendor of the MFP 10. In a modification, the notification server 200 may be provided on the Internet 6 by this vendor. In another modification, the vendor of the MFP 10 may use an environment provided by an external cloud computing service without preparing its own hardware for the notification server 200. In this case, the vendor of the MFP 10 may implement the notification server 200 by preparing a program (i.e., a software) for the notification server 200 and introducing it to the above environment. The notification server 200 is a server configured to provide push notification information including push notification screen data and pull notification information including pull notification screen data. The pull notification information is data sent from the notification server 200 to the terminal device 100 in response to a pull notification information request for requesting the notification server 200 to send the pull notification information being sent from the terminal device 100 to the notification server 200. The push notification information is data automatically sent from the notification server 200 to the terminal device 100 without the push notification information request for requesting the notification server 200 to send the push notification information being sent from the terminal device 100 to the notification server 200. The push notification information and the pull notification information are registered in the notification server 200 in response to the vendor providing the notification server 200 being requested to do so by the vendor of the MFP 10, or the like. The notification server 200 includes a memory 230. The memory 230 stores the notification information table 238.

Configurations of Service Providing Server 300 and Service Management Server 400

The service providing server 300 and the service management server 400 are provided on the Internet 6 by the vendor of the MFP 10. In a modification, the service providing server 300 and the service management server 400 may be provided on the Internet 6 by a provider different from this vendor. In another modification, the vendor of the MFP 10 may use an environment provided by an external cloud computing service without preparing its own hardware for the service providing server 300 and the service management server 400. In this case, the vendor of the MFP 10 may implement the service providing server 300 and the service management server 400 by preparing a program (i.e., a software) for the service providing server 300 and the service management server 400 and introducing it to the above environment.

The service providing server 300 is a server for providing a service related to the MFP 10. The service providing server 300 provides a remote print service and a flat-rate service. In a modification, the service providing server 300 may further provide a push scan service and the like. The remote print service is a service for sending a print instruction to the MFP 10 via the service providing server 300 from outside home or office. The flat-rate service is a service of charging predetermined fees when the number of sheets printed in a predetermined period (e.g., one month) is equal to or less than the contractual number of print sheets (e.g., 1000 sheets). This service charges a flat-rate fee as above and also an additional fee that is dependent on the number of printed sheets exceeding the contractual number of printed sheets when the number of sheets printed in the predetermined period exceeds the contractual number of printed sheets (hereafter this service may be referred to as "flat-rate service"). The flat-rate service includes an automatic ordering service of automatically ordering a new cartridge when a remaining amount of ink in the cartridge attached to the MFP 10 is equal to or less than a predetermined remaining amount. The service providing server 300 includes a memory 330. A user table 338 is stored in the memory 330.

The service management server 400 is a server for managing support information of the remote print service and the flat-rate service. The service management server 400 includes a memory 430. A service table 438 is stored in the memory 430. In the service table 438, a model name, country information (e.g., "JP", "US"), first support information and second support information are stored in association with each other. The first support information indicates a value that is either "ON" indicating the remote print service is supported or "OFF" indicating that the remote print service is not supported. The second support information indicates a value that is either "ON" indicating that the flat-rate service is supported or "OFF" indicating that the flat-rate service is not supported.

Figure 2:
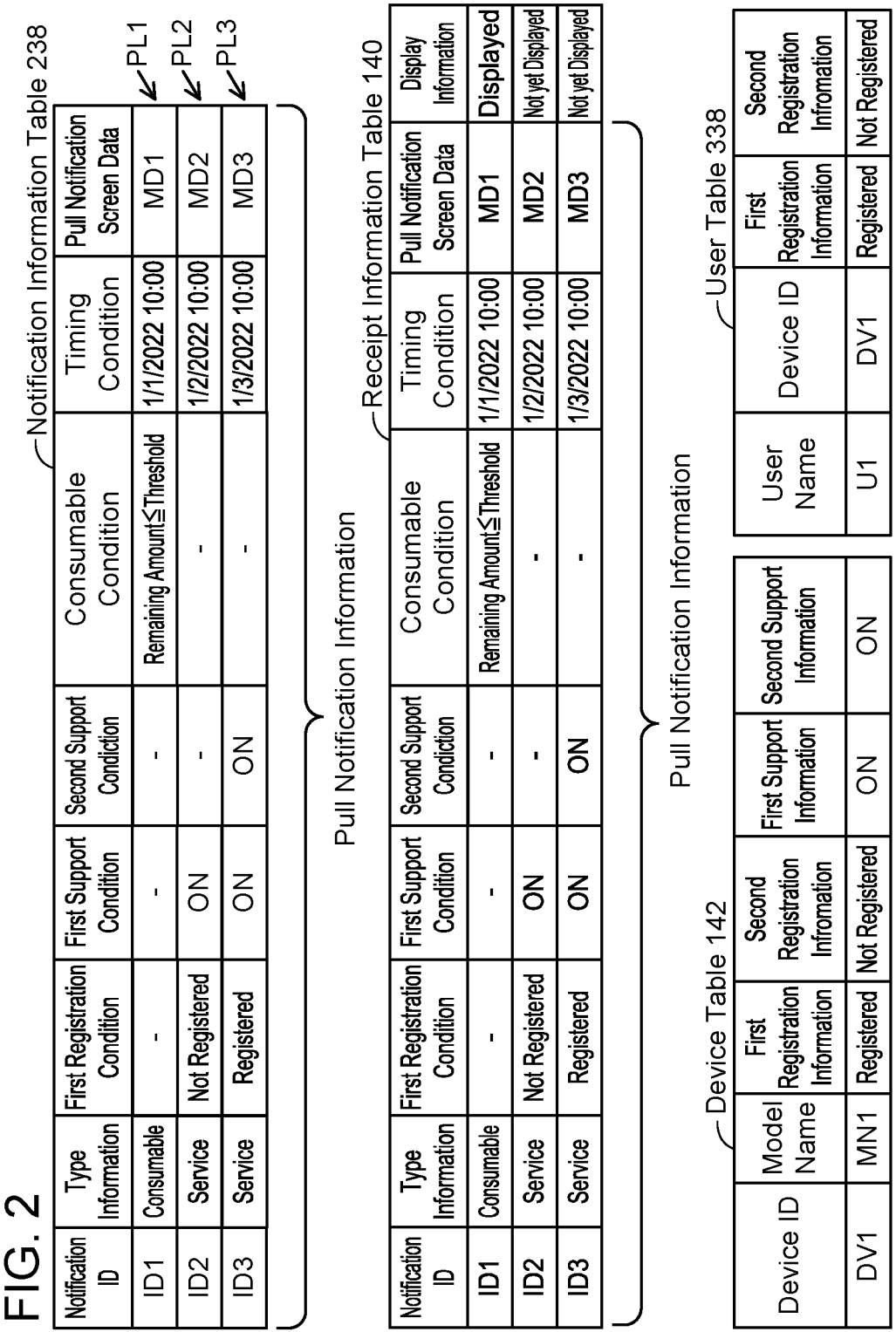
FIG. 2 illustrates examples of tables.

Configurations of Tables; FIG. 2

Next, with reference to FIG. 2, contents of the receipt information table 140 and the device table 142 in the terminal device 100, the notification information table 238 in the notification server 200, and the user table 338 in the service providing server 300 will be described.

The notification information table 238 in the notification server 200 is a table for managing pull notification information (e.g., PL1 to PL3). The pull notification information includes a notification ID for identifying the pull notification information, type information, a timing condition and pull notification scree data corresponding to a pull notification screen. The type information indicates one of "consumable" indicating that the pull notification screen is a screen related to a consumable and "service" indicating that the pull notification screen is a screen related to a service. The timing condition is information indicating a timing at which the pull notification screen is to pop up. In the present embodiment, date-and-time information (e.g., "Jan. 1, 2022 10:00") is registered as the timing condition. In a modification, period information (e.g., "Jan. 1, 2022 10:00 to Jan. 10, 2022 10:00") indicating a period for which the pull notification screen can pop up may be registered as the timing condition. The pull notification information may further include a first registration condition, a first support condition, a second support conditions, and a consumable condition. The respective conditions are information to limit a target screen on which the pull notification screen is pop-up displayed. The first registration condition is information indicating a condition to change whether to pop up the pull notification screen or not depending on whether the MFP 10 is registered in the remote print service. The first registration condition includes one of "registered" indicating that the pull notification is pop-up displayed when the MFP 10 is already registered to the remote print service and "not registered" indicating that the pull notification screen is pop-up displayed when the MFP 10 is not registered to the remote print service. The first support condition is information indicating a condition to change whether to pop up the pull notification screen depending on whether the MFP 10 registered in the app 138 supports the remote print service. The first support condition includes "ON" indicating that the pull notification screen is pop-up displayed when the remote print service is supported. The second support condition is information indicating a condition to change whether to pop up the pull notification screen depending on whether the MFP 10 registered in the app 138 supports the flat-rate service. The second support condition includes "ON" indicating that the pull notification screen is pop-up displayed when the flat-rate service is supported. The consumable condition is information indicating a condition to change whether to pop up the pull notification screen depending on the status of a consumable (in the present embodiment, a cartridge) attached to the MFP 10 registered in the app 138. The consumable condition includes "remaining amount threshold" indicating that the pull notification screen is pop-up displayed when the remaining amount of the cartridge is equal to or lower than a threshold (e.g., "30").

The receipt information table 140 in the terminal device 100 is a table to manage pop-up display of the pull notification information received from the notification server 200. In the receipt information table 140, the pull notification information (e.g., PL1 to PL3) and display information are stored in association with each other. The display information indicates one of "displayed" indicating that the pull notification screen corresponding to the display information has already been displayed and "not yet displayed" indicating that this notification screen has not been displayed yet.

The device table 142 in the terminal device 100 is a table for managing information related to the MFP 10 registered in the app 138. In the device table 142, a device ID, a model name, first registration information, second registration information, first support information and second support information are stored in association with each other. The first registration information indicates one of "registered" indicating that registration for using the remote print service is completed and "not registered" indicating that registration for using the remote print service is not completed. The second registration information indicates one of "Registered" indicating that registration for using the flat-rate service is completed and "Not registered" indicating that registration for using the flat-rate service is not completed.

The user table 338 in the service providing server 300 is a table for managing information related to the user. In the user table 338, a user name for identifying the user, the device ID, the first registration information and the second registration information are stored in association with each other. The user ID is registered when the user subscribes to the remote print service or the flat-rate service.

Figure 3:
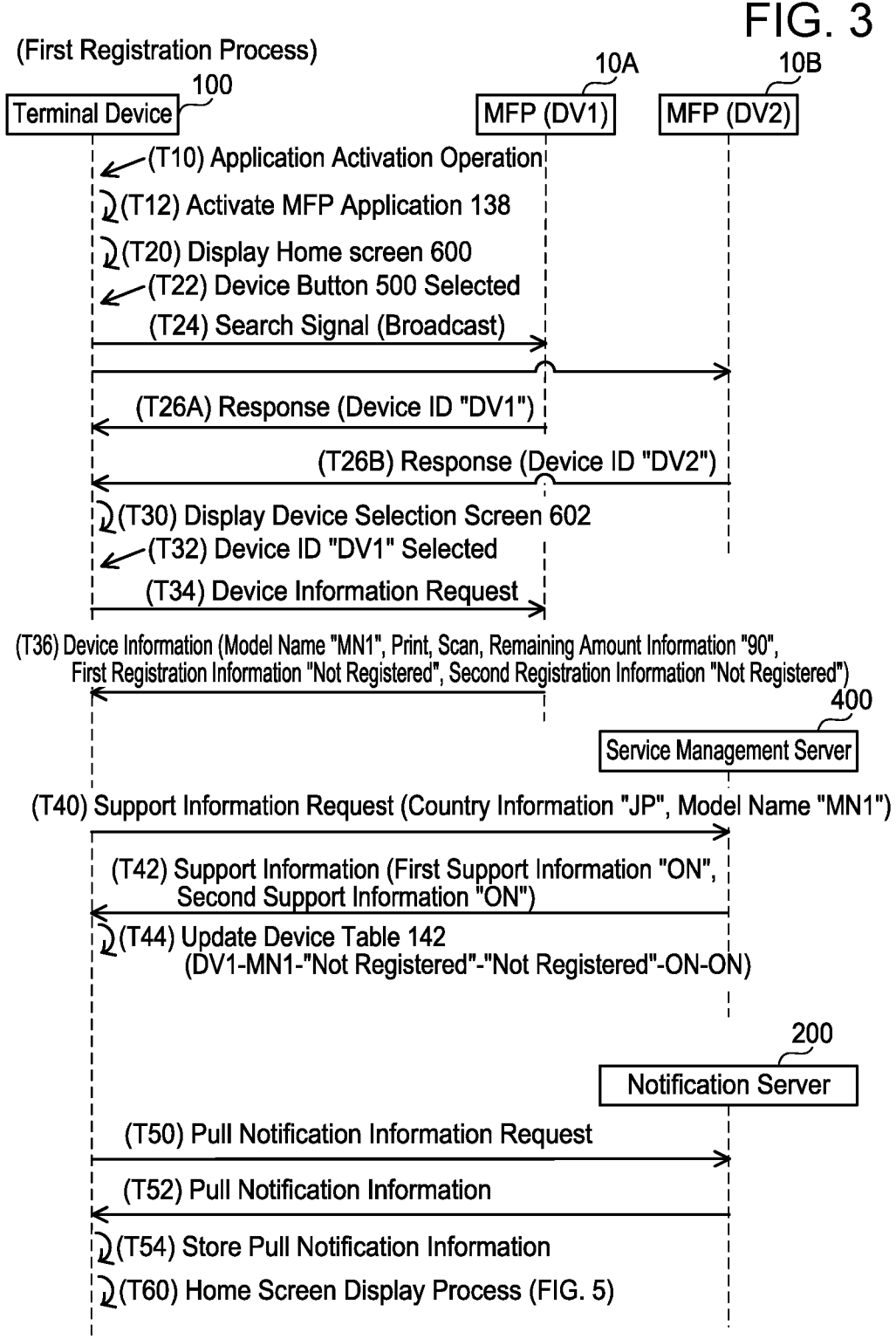
FIG. 3 illustrates a sequence diagram of a first registration process.
Figure 4:
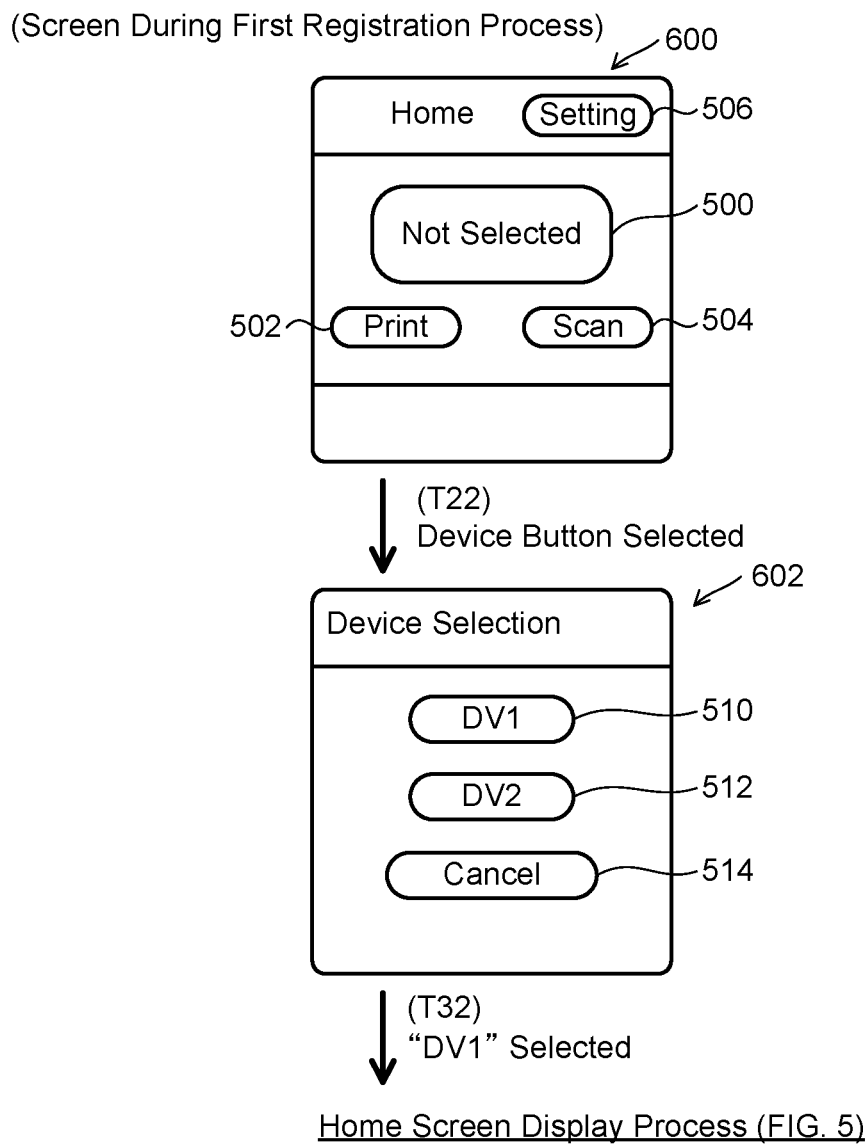
FIG. 4 illustrates an example of a screen displayed on a terminal device during the first registration process.
Figure 5:
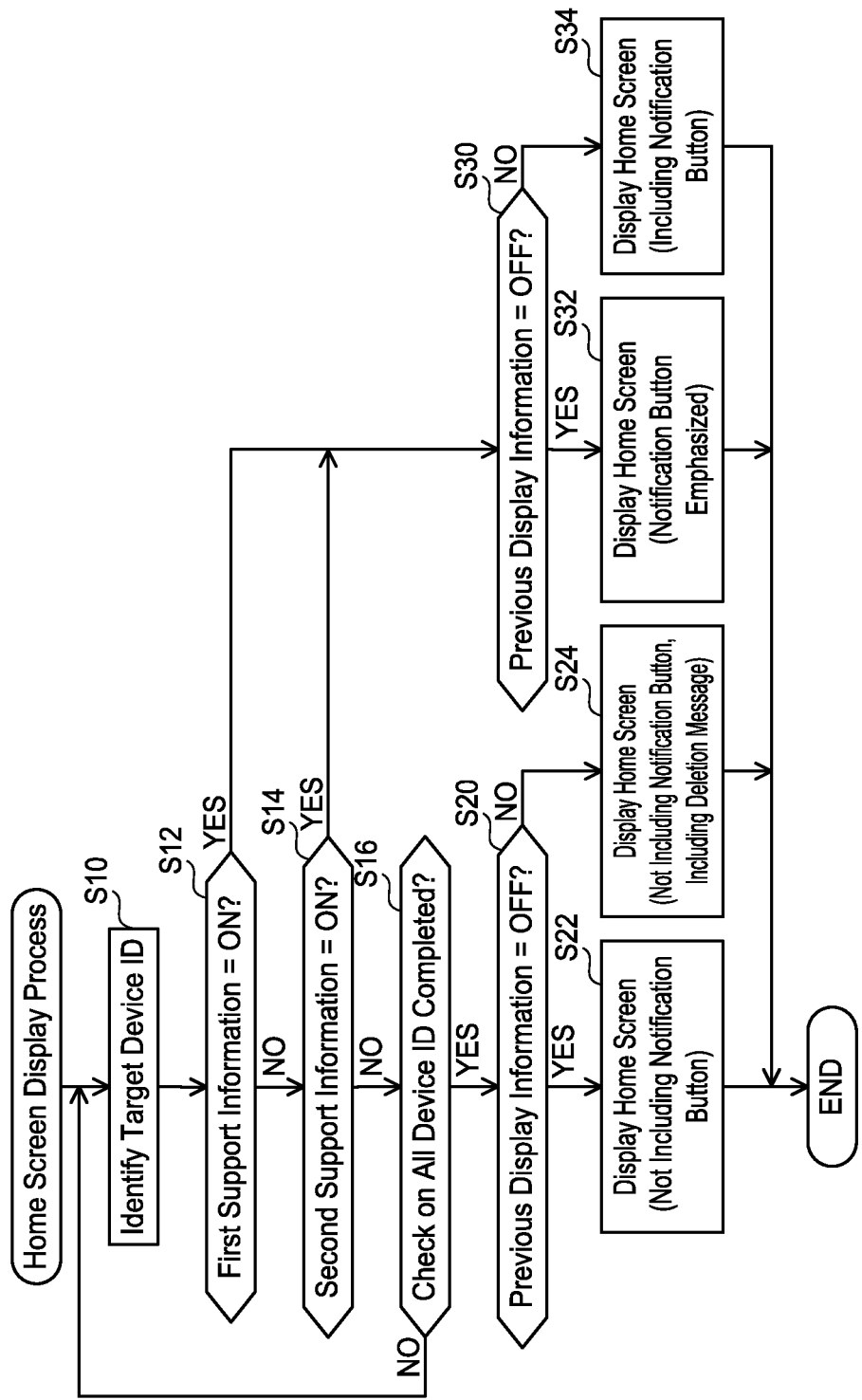
FIG. 5 illustrates a flowchart of a home screen display process.

First Registration Process; FIGS. 3 to 5

A first registration process will be described with reference to FIG. 3 and FIG. 5. The first registration process is a process for registering the MFP 10A in the app 138. Hereafter, all the communication executed between the terminal device 100 and other devices (MFP 10, the notification server 200, the service providing server 300 and the service management server 400) are executed via the communication I/F 116 of the terminal device 100. Accordingly, the recitation "via the communication I/F 116" will be omitted. Further, hereafter when the process executed by the CPU 132 of the terminal device 100 in accordance with the OS 136 or the app 138 is explained, the OS 136 or app 138 will be described as a subject of the processes.

When the OS 136 of the terminal device 100 accepts an operation to activate the app 138 in T10, the OS 136 supplies an activation instruction to the app 138 in T12. The app 138 is activated in response to acquiring the activation instruction from the OS 136. Next, the app 138 displays the home screen 600 on the display 114. Specifically, the app 138 supplies a display instruction for displaying the home screen 600 to the OS 136 and the OS 136 displays the home screen 600 on the display 114. In other words, the app 138 displays the home screen 600 on the display 114 via the OS 136. Hereafter, the recitation "via the OS 136" in the cases where the app 138 instructs to display a screen on the display 114 will be omitted. As illustrated in FIG. 4, the home screen 600 includes a device button 500, a print button 502, a scan button 504 and a setting button 506. The setting button 506 is a button for displaying an app setting screen 622 (see FIG. 11) to be described later. On the device button 500, a device name (e.g., "DV1", "DV2") of an MFP registered as an MFP which is to execute a print function or a scan function, or information "not selected" indicating that an MFP which is to execute a printing function or a scan function is not registered is displayed. In the present process, the information "not selected" indicating that an MFP which is to execute a printing function or a scan function is not selected is displayed on the device button 500.

When the app 138 accepts selection of the device button 500 in T22 of FIG. 3, the app 138 broadcasts a search signal in T24. Specifically, the app 138 supplies, to the OS 136, a sending instruction for causing the OS 136 to send the search signal and the OS 136 broadcasts the search signal. In other words, the app 138 broadcasts the search signal via the OS 136. Hereafter, the recitation "via the OS 136" in the cases in which the app 138 sends a signal to an external device (e.g., the MFP 10A) will be omitted. The search signal is a signal for requiring each of one or more peripheral devices (e.g., MFPs 10A, 10B) connected to the LAN 4 to send a response signal including a device ID of the peripheral device. The app 138 receives a response including the device ID "DV1" from the MFP 10A in T26A and receives a response including the device ID "DV2" from the MFP 10B in T26B. Specifically, the OS 136 receives the response including the device ID "DV1" from the MFP 10A and the app 138 acquires the response including the device ID "DV1" from the OS 136. In other words, the app 138 receives the response from the MFP 10A via the OS 136. Hereafter, the recitation "via the OS 136" in the cases in which the app 138 receives a signal from an external device (e.g., the MFP 10A) will be omitted. Next, the app 138 displays a device selection screen 602 on the display 114 in T30. As illustrated in FIG. 4, the device selection screen 602 includes a first device selection button 510 including the device ID "DV1", a second device selection button including the device ID "DV2" and a cancel button 514.

When the app 138 accepts selection of the first device selection button 510 (i.e., the device ID "DV1") in T32 of FIG. 3, the app 138 sends a device information request to the MFP 10A having the device ID "DV1" in T34. The device information request is a signal requesting for sending of device information including the model name of the MFP 10, functions which the MFP 10 can execute, remaining amount information indicating a remaining amount of a cartridge attached to the MFP 10, the first registration information and the second registration information. In T36, the app 138 receives the device information including the model name "MN1", the print function, the scan function, the remaining amount information "90", the first registration information "not registered" and the second registration information "not registered" from the MFP 10A.

In T40, the app 138 sends, to the service management server 400, a support information request including the country information "JP" indicating that a country where the MFP 10A is set up is Japan and the model name "MN1". The support information request is a signal requesting for sending of first support information and second support information associated with the country information and the model name in the request.

When the service management server 400 receives the support information request from the terminal device 100 in T40, the service management server 400 identifies, in the service table 438, the first support information "ON" and the second support information "ON" associated with the model name "MN1" and the country information "JP" in the request. Then, in T42, the service management server 400 sends support information including the first support information "ON" and the second support information "ON" to the terminal device 100. If the country where the MFP 10A is set up is the United States, the app 138 sends a support information request in T40 including country information "US" indicating that the country where the MFP 10A is set up is the United States and the model name "MN1" to the service management server 400. Then, the service management server 400 identifies, in the service table 438, the first support information "ON" and the second support information "OFF" associated with the model name "MN1" and the country information "US" in the request, and sends the support information including the first support information "ON" and the second support information "OFF" to the terminal device 100 in T42.

When the app 138 receives the support information from the service management server 400 in T42, the app 138 stores the received device ID "DV1" (see T26A), the received model name "MN1" (see T36), the received first registration information "not registered" (see T36), the received second registration information "not registered" (see T36), the received first support information "ON" (see T42) and the received second support information "ON" (see T42) in the device table 142 in association with each other in T44. Specifically, the app 138 supplies an instruction to store the respective information (the device ID "DV1", the model name "MN1", the first registration information "not registered", the second registration information "not registered", the first support information "ON" and the second support information "ON") to the OS 136 and the OS 136 stores the information in the device table 142. In other words, the app 138 stores the respective information in the device table 142 via the OS 136. Hereafter, the recitation "via the OS 136" in the cases in which the app 138 stores information in the memory 134 will be omitted. Thereafter, the app 138 periodically (e.g., every 24 hours) sends the support information request to the service management server 400. In other words, the app 138 repeatedly sends the support information request to the service management server 400. In a modification, the app 138 may not repeatedly send the support information request. For example, the app 138 may send the support information request to the service management server 400 only immediately after the MFP 10A has been registered in the app 138.

The app 138 sends the pull notification information request to the notification server 200 in T50. The pull notification information request is a signal requesting for sending of the pull notification information which the notification server 200 stores. The app 138 receives the pull notification information from the notification server 200 in T52 and stores the pull notification information in T54. Specifically, the app 138 stores the received pull notification information and the display information "not yet displayed" in the receipt information table 140 in association with each other. Consequently, the user can use the terminal device 100 to cause the MFP 10A to execute a print function and a scan function. Thereafter, the app 138 periodically (e.g., every 12 hours) receives the device information from the MFP 10A. Next, the app 138 executes the home screen display process (see FIG. 5) in T60.

Home Screen Display Process; FIG. 5

Next, with reference to FIG. 5, the home screen display process executed by the app 138 will be explained. The home screen display process is a process for determining whether to display the notification button 508 (see FIG. 6) on the home screen. The notification button 508 is a button for displaying a notification list screen (illustration omitted) including a list of pull notification information in the receipt information table 140. When the app 138 displays the home screen in the state in which one or more MFPs are registered in the app 138, the app 138 starts the process of FIG. 5.

In S10, the app 138 identifies one device ID as a target device ID from one or more device IDs in the device table 142.

In S12, the app 138 determines whether the first support information associated with the target device ID in the device table 142 is "ON". When the first support information associated with the target device ID is "ON" (YES in S12), the app 138 proceeds to S30, while the app 138 proceeds to S14 when the first support information is "OFF" (NO in S12).

In S14, the app 138 determines whether the second support information associated with the target device ID in the device table 142 is "ON". When the second support information associated with the target device ID is "ON" (YES in S14), the app 138 proceeds to S30 while the app 138 proceeds to S16 when this second support information is "OFF" (NO in S14). As described above, the app 138 periodically (e.g., every 24 hours) sends the support information request to the service management server 400. Therefore, the app 138 can receive the latest information of the service table 438 in the service management server 400. With such a configuration, even when the support information about the remote print service and the flat-rate service for the MFP 10 having the target device ID has been changed, the app 138 can correctly determine whether the MFP 10 supports the remote print service and the flat-rate service. When countries where the MFPs 10 are set up are different, whether the remote print service and the flat-rate service are supported or not may differ even if the MFPs 10 have the same model name (see FIG. 1). As illustrates in T42 of FIG. 3, the app 138 sends the support information request including the country information to the service management server 400. Consequently, the app 138 can receive, from the service management server 400, the support information corresponding to the countries where the MFPs 10 are set up. Therefore, the app 138 can correctly determine whether the MFP 10 having the target device ID supports the remote print service and the flat-rate service.

In S16, the app 138 determines whether the processes of S10 to S14 (hereafter the processes may be referred to as "support check process") have been executed on all the device ID(s) in the device table 142. When the app 138 determines that the support check process has been executed on all the device ID(s) (YES in S16), the app 138 proceeds to S20 while the app 138 returns to S10 when the app 138 determines that the support check process has not been performed on one or more device IDs (NO in S16). In other words, the app 138 repeatedly executes the support check process until the support check process on all the device ID(s) is completed.

In S20, the app 138 determines whether previous display information in the memory 134 is "OFF". The previous display information is information for indicating whether the notification button 508 was displayed when the home screen was previously displayed. The previous display information includes one of "ON" indicating that the notification button 508 was displayed when the home screen was previously displayed and "OFF" indicating that the notification button 508 was not displayed when the home screen was previously displayed. When the previous display information is "OFF" (YES in S20), the app 138 proceeds to S22 while the app 138 proceeds to S24 when the previous display information is "ON" (NO in S20).

Figure 7:
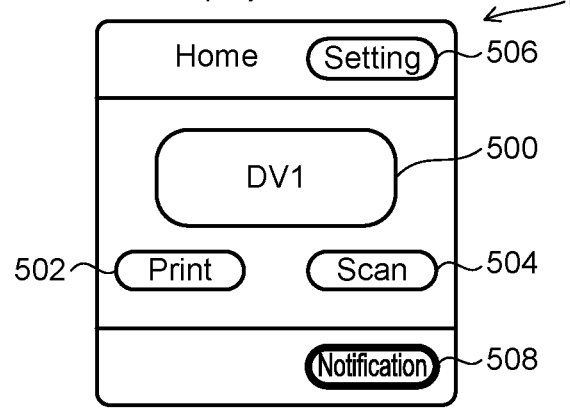
FIG. 7 illustrates an example of a home screen on which a notification button is displayed in an emphasized manner.

In S22, the app 138 displays the home screen not including the notification button 508 (see FIG. 7) on the display 114. In a modification, the app 138 may display the home screen including the invalidated notification button 508 on the display 114. When S22 ends, the app 138 ends the process of FIG. 5.

Figure 6:
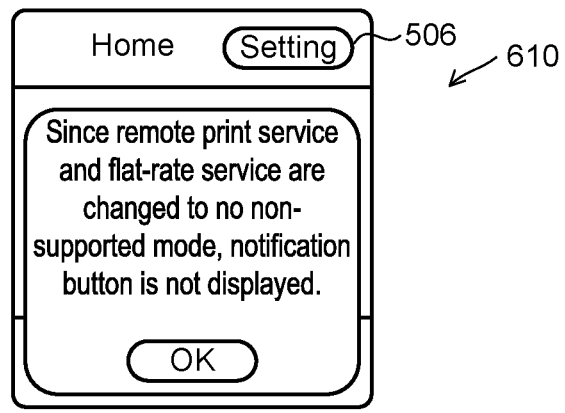
FIG. 6 illustrates a home screen including a deletion message.

In S24, the app 138 displays the home screen including a deletion message but not including the notification button 508 on the display 114. As illustrated in FIG. 6, the deletion message displayed on the home screen 610 is a message explaining that the notification button is not displayed. In a modification, the app 138 may display the home screen including the invalidated notification button 508 on the display 114. In S24, the app 138 further changes the previous display information from "ON" to "OFF". When S24 ends, the app 138 ends the process of FIG. 5. The case in which NO is determined in S20 is a case in which, for example, the first support information and the second support information previously received from the service management server 400 are "ON" and the first support information and the second support information received this time from the service management server 400 are "OFF". When the first support information and the second support information are "OFF", it is highly likely that the pull notification information is not beneficial to the user. According to the above configuration, since the notification button 508 is not displayed, display of information which is not beneficial to the user can be suppressed. Accordingly, user convenience can be enhanced. Further, since the deletion message is displayed, the user can recognize that the state of the MFP 10 has been changed to the state in which the remote print service or the flat-rate service is not supported.

When YES is determined in S12 or YES is determined in S14, the app 138 determines whether the previous display information in the memory 134 is "OFF" in S30. When the previous display information is "OFF" (YES in S30), the app 138 proceeds to S32 while the app 138 proceeds to S34 when the previous display information is "ON" (NO in S30).

In S32, the app 138 displays the home screen including the validated notification button 508 displayed in an emphasized manner on the display 114. As illustrated in the home screen 612 of FIG. 7, the notification button 508 is emphasized by being illustrated by a line thicker than other buttons. In a modification, the notification button 508 may blink or the line of the notification button 508 may be displayed in a color different from lines of the other buttons. In S32, the app 138 further changes the previous display information from "OFF" to "ON". When S32 ends, the app 138 ends the process of FIG. 5. The case in which YES is determined in S30 is, for example, the case immediately after the first registration process or the case in which the first support information and the second support information previously received from the management server 400 are "OFF" and the first support information and the second support information received this time from the service management server 400 are "ON". By the notification button 508 being displayed, the user can display the notification list screen. Consequently, the beneficial information can be provided to the user, by which user convenience can be enhanced. Since the notification button 508 is displayed in the emphasized manner, the user can recognize that the state of the MFP 10 has been changed to the state in which the remote print service or the flat-rate service is supported.

In S34, the app 138 displays the home screen including the validated notification button 508 displayed in a non-emphasized manner on the display 114. When S34 ends, the app 138 ends the process of FIG. 5.

Figure 8:
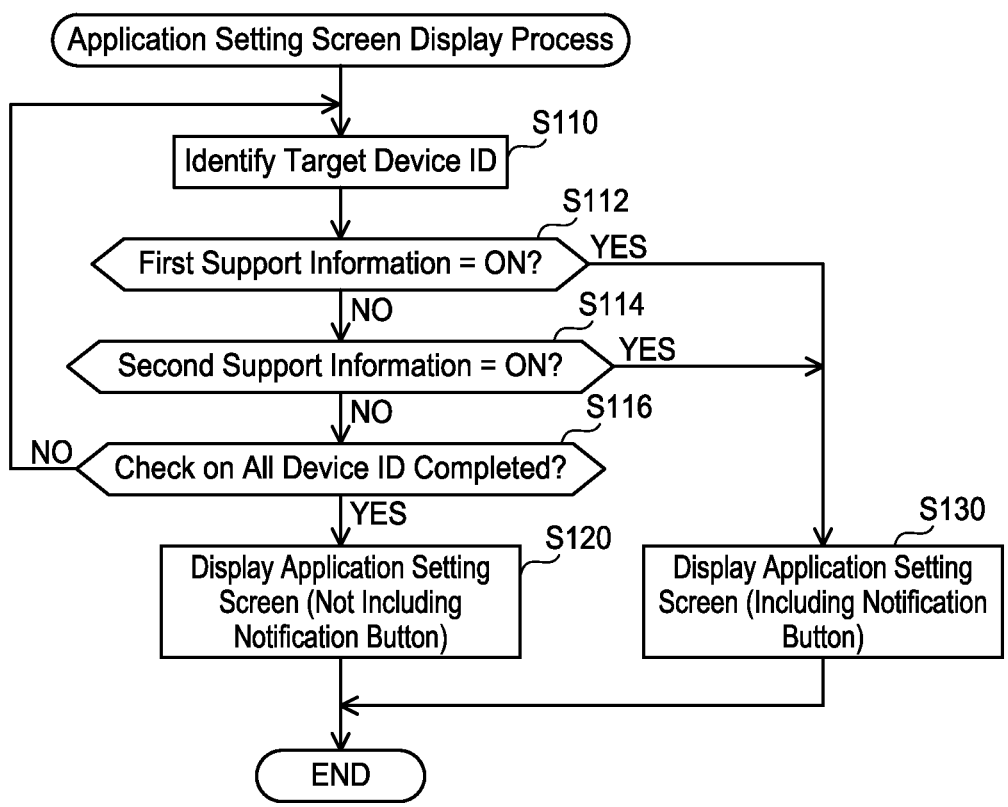
FIG. 8 illustrates a flowchart of an app setting screen display process.

App Setting Screen Display Process; FIG. 8

Next, with reference to FIG. 8, an app setting screen display process executed by the app 138 will be described. The app setting screen display process is a process for determining whether to display a notification setting button 522 to be described later (see FIG. 11) on the app setting screen. The notification setting button 522 is a button for displaying a notification setting screen 624 (see FIG. 11) on which settings of the consumable notification flag 148 and the service notification flag 150 can be changed. When the setting button 506 (see FIG. 7) on the home screen is selected, the app 138 starts the process of FIGS. 8.

S110 to S116 are the same as S10 to S16 of FIG. 5. When YES is determined in S112, the app 138 proceeds to S130, while the app 138 proceeds to S114 when NO is determined in S112. When YES is determined in S114, the app 138 proceeds to S130 while the app 138 proceeds to S116 when NO is determined in S114. When YES is determined in S116, the app 138 proceeds to S120 while the app 138 returns to S110 when NO is determined in S116.

In S120, the app 138 displays the app setting screen not including the notification setting button 522 to be described later (see FIG. 11) on the display 114. When S120 ends, the app 138 ends the process of FIG. 8.

In S130, the app 138 displays the app setting screen 622 (see FIG. 11) including the notification setting button 522 to be described later (see FIG. 11) on the display 114. When S130 ends, the app 138 ends the process of FIG. 8.

Figure 9:
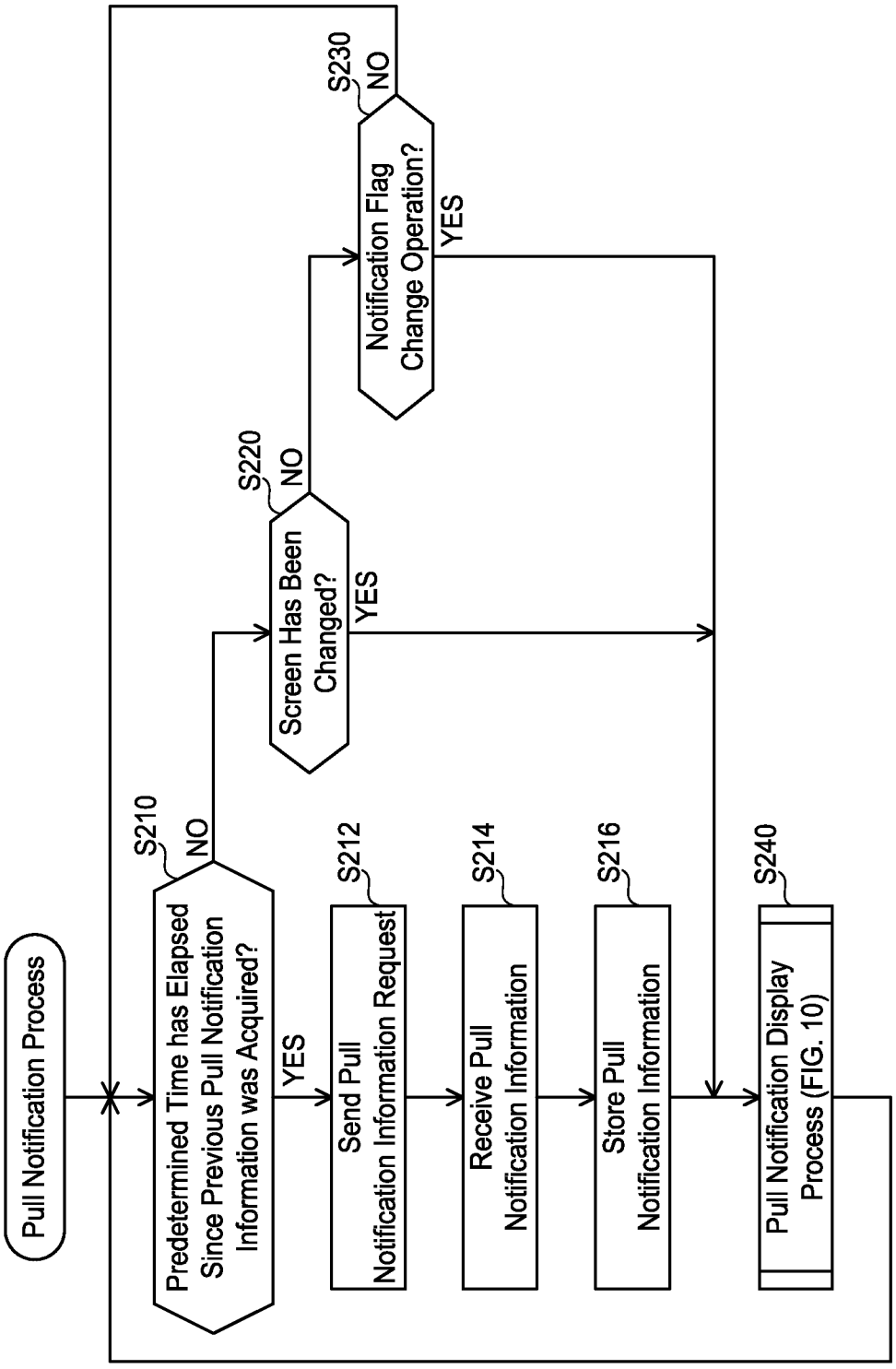
FIG. 9 illustrates a flowchart of a pull notification process.
Figure 10:
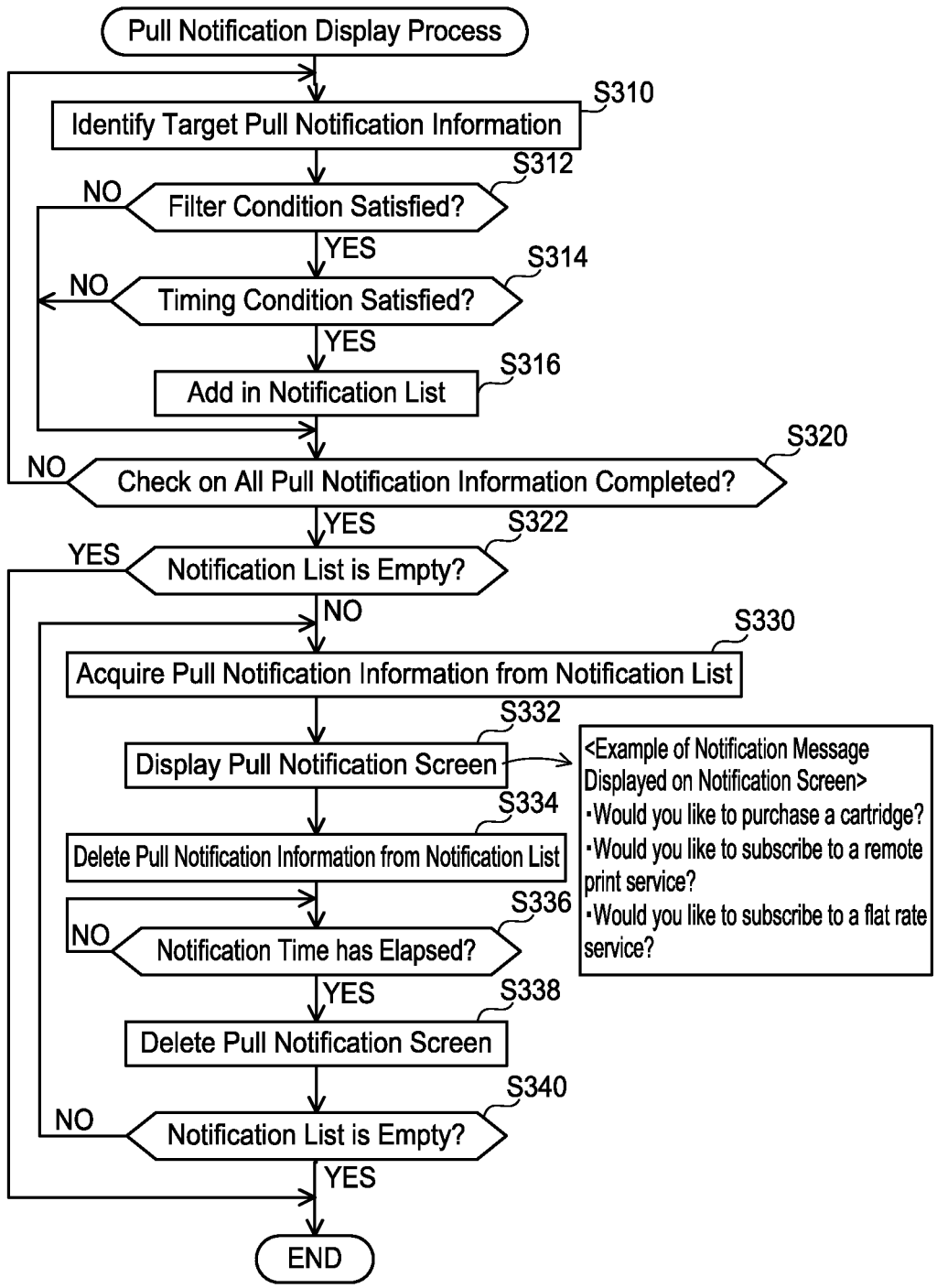
FIG. 10 illustrates a flowchart of a pull notification display process.

Pull Notification Display Process; FIG. 9, FIG. 10

Next, with reference to FIG. 9, FIG. 10, the pull notification process executed by the app 138 will be described. When the app 138 is activated after the first registration process (see FIG. 3) has been completed, the app 138 starts the process of FIG. 9.

In S210, the app 138 monitors a predetermined time (e.g., 24 hours) having elapsed since the pull notification information was previously received from the notification server 200. When the predetermined time has elapsed since the pull notification information was previously received from the notification server 200, the app 138 determines YES in S210 and proceeds to S212.

The app 138 sends the pull notification information request to the notification server 200 in S212 and receives the pull notification information from the notification server 200 in S214. Next, in S216, the app 138 stores the received pull notification information and the display information "not yet displayed" in association with each other in the receipt information table 140. When S216 ends, the app 138 proceeds to S240.

At the same time as the monitoring in S210, the app 138 determines if the screen displayed on the display 114 has been changed in S220. When the app 138 determines that the screen displayed on the display 114 has been changed, the app 138 determines YES in S220 and proceeds to S240.

Further, at the same time as the monitoring of S210 and S220, the app 138 determines whether the app 138 has accepted an operation to change either the consumable notification flag 148 or the service notification flag 150 (hereafter this operation may be referred to as "notification flag change operation") in S230. When the app 138 accepts the notification flag change operation, the app 138 determines YES in S230 and proceeds to S240.

In S240, the app 138 executes a pull notification display process (see FIG. 10). The pull notification display process is a process to determine whether to pop up the pull notification screen on the display 114. When the process of S240 ends, the app 138 returns to S210.

Pull Notification Display Process; FIG. 10

Next, with reference to FIG. 10, the pull notification display process executed in S240 of FIG. 9 will be described. In S310, the app 138 identifies one piece of pull notification information associated with the display information "not yet displayed" in the receipt information table 140 as target pull notification information.

In S312, the app 138 determines whether a filter condition is satisfied by using the target pull notification information. The app 138 proceeds to S314 when the filter condition is satisfied (YES in S312), while the app 138 proceeds to S320 when the filter condition is not satisfied (NO in S312). Hereafter, the process of determining whether the filter condition is satisfied (hereafter the process may be referred to as "filter condition process") will be described. First, the app 138 identifies the type information in the target pull notification information ("consumable" or "service"). Then, the app 138 determines whether the notification flag corresponding to the identified type information (the consumable notification flag 148 or the service notification flag 150) is "ON" or not. When the notification flag corresponding to the identified type information is "OFF", the app 138 determines that the filter condition is not satisfied (NO in S312). On the other hand, when the notification flag corresponding to the identified type information is "ON", the app 138 continues the filter condition process. Next, the app 138 determines whether the target pull notification information includes the first registration condition or not. When the target pull notification information includes the first registration condition, the app 138 determines whether the first registration condition and the first registration information of the selected MFP 10 in the device table 142 match or not. When the first registration condition and the first registration information do not match, the app 138 determines that the filter condition is not satisfied (NO in S312). On the other hand, when the first registration condition and the first registration information match, the app 138 continues the filter condition process. Next, the app 138 determines whether the target pull notification information includes the first support condition or not. When the target pull notification information includes the first support condition, the app 138 determines whether the first support information of the selected MFP 10 in the device table 142 is "ON" or not. When the first support information is "OFF", the app 138 determines that the filter condition is not satisfied since the first support condition is not satisfied (NO in S312). On the other hand, when the first support information is "ON", the app 138 determines that the first support condition is satisfied and continues the filter condition process. When the target pull notification information does not include the first support condition as well, the app 138 continues the filter condition process. Next, the app 138 determines whether the target pull notification includes the second support condition. When the target pull notification information includes the second support condition, the app 138 determines whether the second support information of the selected MFP in the device table 142 is "ON" or not. When the second support information is "OFF", the app 138 determines that the filter condition is not satisfied since the second support condition is not satisfied (NO in S312). On the other hand, when the second support information is "ON", the app 138 determines that the second support condition is satisfied and continues the filter condition process. When the target pull notification information does not include the second support condition as well, the app 138 continues the filter condition process. Then, the app 138 determines whether the target pull notification information includes the consumable condition or not. When the target pull notification information includes the consumable condition, the app 138 determines whether the remaining amount indicated by the remaining amount information of the selected MFP 10 stored in the memory 134 is equal to or lower than a threshold in the consumable condition. When the remaining amount is greater than the threshold, the app 138 determines that the filter condition is not satisfied since the consumable condition is not satisfied (NO in S312). On the other hand, when the remaining amount is equal to or lower than the threshold, the app 138 determines that the consumable support condition is satisfied and determines that the filter condition is satisfied. When the target pull notification information does not include the consumable condition as well, the app 138 determines that the filter condition is satisfied. As described above, when the notification flag corresponding to the type information included in the target pull notification is "ON" and when all the conditions (except the timing condition) included in the target pull notification information are satisfied, the app 138 determines that the filter condition is satisfied (YES in S312).

In S314, the app 138 uses the target pull notification information to determine whether the timing condition is satisfied or not. The app 138 acquires date-and-time information included in the timing condition and determines whether the current date and time is after the date and time indicated by the acquired date-and-time information (hereafter the date and time may be referred to as "notification date and time"). When the current day and time is after the notification day and time, the app 138 determines that the timing condition is satisfied (YES in S314) and proceeds to S316, while when the current day and time is before the notification day and time, the app 138 determines that the timing condition is not satisfied (NO in S314) and proceeds to S320.

In S316, the app 138 adds the target pull notification information in the notification list 144.

In S320, the app 138 determines whether the processes of S310 to S316 (hereafter the processes may be referred to as "notification check process") have been executed on all the pull notification information associated with the display information "not yet displayed" in the receipt information table 140. When the app 138 determines that the notification check process has been executed on all the pull notification information (YES in S320), the app 138 proceeds to S322 while when the app 138 determines that the notification check process is not performed on one or more pull notification information (NO in S320), the app 138 returns to S310. In other words, the app 138 repeats the notification check process until the notification check on all the pull notification information associated with the display information "not yet displayed" in the receipt information table 140 is completed.

In S322, the app 138 determines whether the notification list 144 is empty or not. When the notification list 144 is empty (YES in S322), the app 138 ends the process of FIG. 10. On the other hand, when the notification list 144 is not empty (NO in S322), the app 138 proceeds to S330.

In S330, the app 138 acquires one piece of pull notification information from the notification list 144.

In S332, the app 138 pop-up displays, on the display 114, the pull notification screen corresponding to the pull notification screen data included in the acquired pull notification information. On the pull notification screen, a message related to a cartridge (e.g., "would you like to purchase a cartridge?"), a message related to a remote print service (e.g., "would you like to subscribe to a remote print service?"), a message related to the flat-rate service (e.g., "would you like to subscribe to a flat-rate service?"), or the like.

In S334, the app 138 deletes the pull notification information corresponding to the acquired pull notification information from the notification list 144. Further, the app 138 changes the display information associated with the acquired pull notification information in the receipt information table 140 from "not yet displayed" to "displayed".

In S336, the app 138 determines whether a time which has elapsed since the pull notification screen was pop-up displayed exceeds a notification time (e.g., 10 seconds). When the elapsed time exceeds the notification time, the app 138 determines YES in S336 and proceeds to S338.

In S338, the app 138 deletes the pull notification screen from the display 114.

S340 is the same as S322. When the app 138 determines YES in S340, the app 138 ends the process of FIG. 10. On the other hand, when the app 138 determines NO in S340, the app 138 returns to S330. In other words, the app 138 repeatedly executes the processes of S330 to S338 until the notification list 144 becomes empty. In other words, the pull notification screen may be consecutively pop-up displayed on the display 114.

Figure 11:
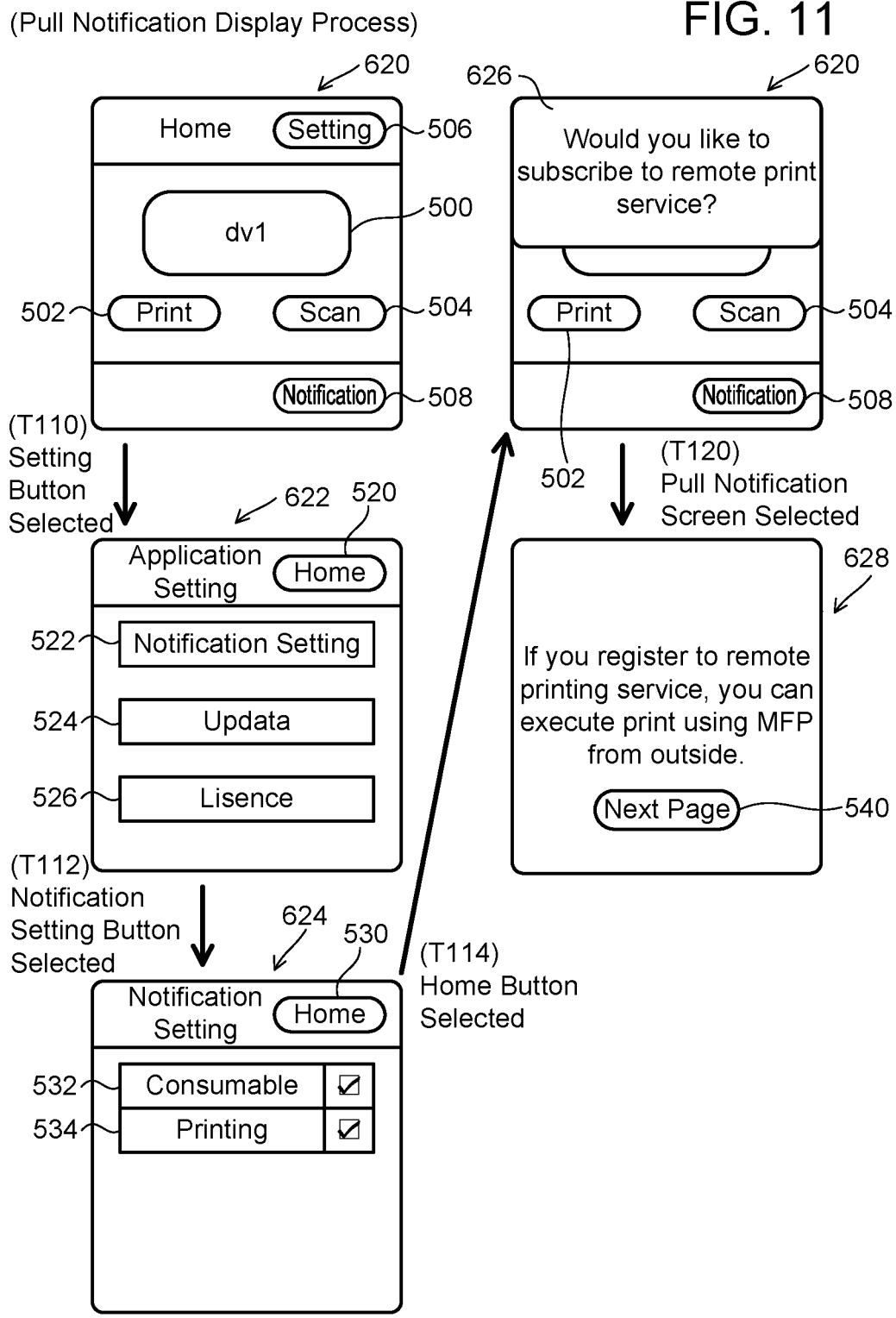
FIG. 11 illustrates a pull notification display process.

Pull Notification Screen Display Process; FIG. 11

Next, with reference to FIG. 11, a pull notification screen display process in which the pull notification screen 626 is pop-up displayed on the display 114 will be described. The initial state of this process is the state after the first registration process (see FIG. 3), and the device ID "DV1", the model name "MN1", the first registration information "not registered", the second registration information "not registered", the first support information "ON" and the second support information "ON" are stored in the device table 142 in association with each other. The display information "not yet displayed" and the second pull notification information PL2 (see FIG. 2) including the notification ID "ID2", the type information "service", the first registration information "not registered", the first support condition "ON" and the timing condition "Jan. 2, 2022/10:00" are stored in the receipt information table 140 in association with each other. The remaining amount information "20" of the MFP 10A is stored in the memory 134 of the terminal device 100. The current date and time is "Jan. 2, 2022 9:58".

As illustrated in FIG. 11, in the initial state of the present process, the home screen 620 is displayed on the display 114 of the terminal device 100. The home screen 620 is the same as the home screen 612 of FIG. 7 except that the notification button 508 is displayed in a non-emphasized manner.

When the app 138 accepts selection of the setting button 506 in T110, the app 138 executes the app setting screen display process (see FIG. 8). The app 138 identifies the device ID "DV1" in the device table 142 as the target device ID (S110) and determines that the first support information associated with the device ID "DV1" in the device table 142 is "ON" (YES in S112). In this case, the app 138 displays the app setting screen 622 including the notification setting button 522 on the display 114. The app setting screen 622 further includes the home button 520 for displaying the home screen, an update button 524 for updating the app 138 and a license button 526 for checking license information of the app 138.

When the app setting screen 622 is displayed on the display 114, the app 138 determines that the screen displayed on the display 114 has been changed from the home screen 620 to the app setting screen 622 (YES in S220 of FIG. 9) and executes the pull notification display process (see FIG. 10). The app 138 identifies the second pull notification information PL2 associated with the display information "not yet displayed" in the receipt information table 140 as the target pull notification information (S310). Next, the app 138 determines whether the filter condition is satisfied (S312). First, the app 138 identifies that the type information in the second pull notification information PL2 is "service" and determines that the service notification flag 150 is "ON". Next, the app 138 determines that the first registration condition "not registered" in the second pull notification information PL2 and the first registration information "not registered" of the MFP 10A in the device table 142 match, and the app 138 determines that the first support condition "ON" in the second pull notification information PL2 and the first support information "ON" of the MFP 10A in the device table 142 match. In this case, the app 138 determines that the filter condition is satisfied (YES in S312). Next, the app 138 determines that the current date and time "Jan. 2, 2022 9:58" is before the notification date and time "Jan. 2, 2022 10:00" and determines that the timing condition is not satisfied (NO in S314). In this case, the second pull notification information PL2 is not added to the notification list 144. Next, the app 138 determines that the notification check on all the pull notification information associated with the display information "not yet displayed" in the receipt information table 140 has been completed (YES in S320) and determines that the notification list 144 is empty (YES in S322). In this case, the pull notification screen is not pop-up displayed.

When the app 138 accepts selection of the notification setting button 522 in T112, the app 138 displays the notification setting screen 624 on the display 114. The notification setting screen 624 includes a home button 530, a consumable notification setting box 532 for changing settings of the consumable notification flag 148 and a service notification setting box 534 for changing settings of the service notification flag 150. The app 138 determines that the screen displayed on the display 144 has been changed from the app setting screen 622 to the notification setting screen 624 (YES in S220 of FIG. 9) and executes the pull notification display process (see FIG. 10). The app 138 identifies the second pull notification information PL2 associated with the display information "not yet displayed" in the receipt information table 140 as the target pull notification information (S310). Similar to the case in which the app setting screen 622 is displayed, the app 138 determines that the filter condition is satisfied (YES in S312) and the timing condition is not satisfied (YES in S312), and does not add the second pull notification information PL2 to the notification list 144 (S316). Next, the app 138 determines that the notification check on all the pull notification information has been completed (YES in S320) and determines that the notification list 144 is empty (YES in S322). In this case as well, the pull notification screen is not pop-up displayed.

When the app 138 accepts selection of the home button 530 in T114, the app 138 executes the home screen display process (see FIG. 5). The app 138 identifies the device ID "DV1" in the device table 142 as the target device ID (S10), determines that the first support information associated with the device ID "DV1" in the device table 142 is "ON" (YES in S12) and determines that the previous display information in the memory 132 is "ON" (NO in S30). In this case, the app 138 displays the home screen 620 on the display 114 (S34). The app 138 determines that the screen displayed on the display 114 has been changed from the notification setting screen 624 to the home screen 610 (YES in S220 of FIG. 9) and executes the pull notification display process (see FIG. 10). The app 138 identifies the second pull notification information PL2 associated with the display information "not yet displayed" in the receipt information table 140 as the target pull notification information (S310). The current date and time in T114 is "Jan. 2, 2022 10:01". Thus, the app 138 determines that the filter condition is satisfied (YES in S312 of FIG. 8), determines that the timing condition is satisfied (YES in S314) and adds the second pull notification information PL2 in the notification list 144 (YES in S316). Next, the app 138 determines that the notification check on all the pull notification information has been completed (YES in S320) and determines that the notification list 144 is not empty (NO in S322). Next, the app 138 acquires the second pull notification information PL2 from the notification list 144 (S330) and display as a pop-up the pull notification screen 626 corresponding to the pull notification screen data MD2 included in the second pull notification information PL2 on the home screen 610 (S332). On the pull notification screen 626, a message prompting the user to subscribe to the remote print service is displayed.

When the app 138 accepts an operation to select the pull notification screen 626 in T120, the app 138 displays the remote print service introduction screen 628 on the display 114. The remote print service introduction screen 628 includes a message explaining the contents of the remote print service and a button 540 to proceed to the next page. Consequently, it is possible to introduce the contents of the remote print service to the user and prompt the user to subscribe to the remote print service.

Second Registration Process

Next, with reference to FIG. 12, the second registration process will be described. The second registration process is a process for registering the MFP 10B in the app 138. The second registration process is executed after the first registration process.

T210 is the same as T10 of FIG. 3. The app 138 executes the home screen display process (see FIG. 5) and displays the home screen 620 (see FIG. 11) on the display 114 in T220. T222 to T230 are the same as T22 to T30 of FIG. 3. When the app 138 accepts selection of the second device selection button 512 (i.e., the device ID "DV2") in T232, the app 138 sends the device information request to the MFP 10B having the device ID "DV2" in T234 and receives the device information including the model name "MN2", the print function, the scan function, the remaining amount information "90", the first registration information "not registered" and the second registration information "not registered" from the MFP 10B in T236.

In T240, the app 138 sends the support information request including the country information "JP" and the model name "MN2" of the MFP 10B to the service management server 400, and when the app 138 receives the support information including the first support information "OFF" and the second support information "OFF" from the service management server 400 in 242, the app 138 stores the received device ID "DV2" (see T226B), the received model name "MN2" (see T236), the first registration information "not registered" (see T236), the second registration information "not registered" (see T236), the received first support information "OFF" (see T242) and the received second support information "OFF" (see T242) in the device table 142 in association with each other in T244.

Next, in T250, the app 138 executes the home screen display process (see FIG. 5). The app 138 identifies the device ID "DV1" in the device table 142 as the target device ID (S10), determines that the first support information associated with the device ID "DV1" in the device table 142 is "ON" (YES in S12) and determines that the previous display information in the memory 134 is "ON" (YES in S30). In this case, the app 138 displays the home screen 630 on which the notification button 508 is displayed in the non-emphasized manner on the display 114. The home screen 630 is the same as the home screen 620 of FIG. 11 except that the device ID "DV2" is displayed on the device button 500.

Effects of Second Registration Process

The information indicated by the pull notification data is information beneficial to the user who can use the service. As illustrated in FIG. 12, the app 138 displays the notification button 508 on the display 114 when only at least one of the MFP 10A and the MFP 10B (the MFP 10A in FIG. 12) supports the remote print service and the flat-rate service. Therefore, as compared to the configuration in which the notification button 508 is displayed only when both the MFP 10A and the MFP 10B support the service, the beneficial information can be provided to the user.

Effects of Present Embodiment

As described above, the terminal device 100 receives the device information including the model name "MN1" from the MFP 10A (T36 of FIG. 3), sends the support information request including the model name "MN1" to the service management server 400 (T40), and receives the first support information from the service management server 400 (T42). The terminal device 100 receives the pull notification information from the notification server 200 (T52). When the first support information is "ON" (YES in S12 of FIG. 5, YES in S112 of FIG. 8), the terminal device 100 displays the notification button 508 or the notification setting button 522 for displaying the pull notification information (S32, S34 of FIG. 5, S130 of FIG. 8). When the first support information is "OFF" (NO in S12 of FIG. 5, NO in S112 of FIG. 8), the terminal device 100 does not display the notification button 508 or the notification setting button 522 (S22, S24 of FIG. 5, S120 of FIG. 8). Consequently, depending on whether the first support information is "ON", whether to display the notification button 508 or the notification setting button 522 can be changed. Accordingly, user convenience can be enhanced.

Corresponding Relationships

The MFP 10A is an example of "first communication device". The model name "MN1" of the MFP 10A is an example of "first device identification information". The service management server 400 is an example of "management server". The first support information is an example of "display related information". The first support information associated with the model name "MN1" of the MFP 10A is an example of "first display related information". The pull notification information and the push notification information are examples of "notification information". The first support information being "ON" is an example of "predetermined information". The notification button 508 and the notification setting button 522 are examples of "object for displaying the notification information". The MFP 10B is an example of "second communication device". The model name "MN2" of the MFP 10B is an example of "second device identification information". The service management server 400 is an example of "management server". The first support information associated with the model name "MN2" of the MFP 10B is an example of "second display related information". The case in which YES is determined in S30 of FIG. 5 is an example of "first case". The emphasized manner and the non-emphasized manner are an example of "first display manner" and "second display manner", respectively. The case in which NO is determined in S20 of FIG. 5 is an example of "second case". The country information "JP" is an example of "first area information". The first support information associated with the model name "MN1" and the area information "JP" is an example of "first display related information". The country information "US" is an example of "second area information". The first support information associated with the model name "MN1" and the area information "US" is an example of "third display related information". The notification setting screen 624 of FIG. 11 is an example of "selection screen".

T36 of FIG. 3 is an example of "receive first device identification information". T40 of FIG. 3 is an example of "send the first device identification information". T42 of FIG. 3 is an example of "receive first display related information". T52 of FIG. 3 is an example of "receive the notification information". S32, S34 of FIGS. 5 and S130 of FIG. 8 are examples of "display, on the display, an object for displaying the notification information".

(First Modification) The "first communication device" and the "second communication device" are not limited to MFPs but may for example be printers, scanners, copy machines, or facsimiles.

(Second Modification) The "device identification information" is not limited to the model name of the MFP 10 but may be the serial number, device name, or the like of the MFP 10.

(Third Modification) The "object for displaying the notification information" is not limited to a button but may be a tab, a banner image or the like.

(Fourth Modification) One of FIG. 5 (home screen display process) and FIG. 8 (app setting screen display process) may be omitted.

(Fifth Modification) Registration of only one MFP may be acceptable in the app 138. In the present modification, the processes of S16 of FIGS. 5 and S116 of FIG. 8 can be omitted. In the present modification, "send the second device identification information" and "receive second display related information" can be omitted.

(Sixth Modification) The app 138 may determine whether all the first support information in the device table 142 is "ON" in S12 of FIG. 5 and determine whether all the second support information in the device table 142 is "ON" in S14. In the present modification, S10 and S16 can be omitted. The same applies to S112, S114 of FIG. 8.

(Seventh Modification) The app 138 may be configured to send the support information request to the service management server 400 only immediately after the MFP 10 has been registered in the app 138. In other words, the app 318 may not repeatedly send the support information request. In the present modification, S20, S24, S30, S32 of FIG. 5 can be omitted.

(Eighth Modification) S30 and S32 of FIG. 5 can be omitted. In the present modification, when YES is determined in S12 or YES is determined in S14, the app 138 proceeds to S34. In another modification, S30 and S34 may be omitted.

(Ninth Modification) In S32 of FIG. 5, the app 138 may encircle the notification button 508 with a line having the same line thickness as the lines of the other buttons, and may display for example a predetermined message in the vicinity of the notification button 508 (e.g., "new").

(Tenth Modification) S20 and S24 of FIG. 5 can be omitted. In the present modification, when YES is determined in S16, the app 138 proceeds to S22.

(Eleventh Modification) The app 138 may be configured to execute the process of S24 when YES is determined in S20 of FIG. 5 and a predetermined time (e.g., 24 hours) elapses.

(Twelfth Modification) The service table 438 of the service management server 400 may not include the country information. In the present modification, the app 138 sends the support information request including only the model name "MN1" of the MFP 10A to the service management server 400 in T40 of FIG. 3.

(Thirteenth Modification) The "area information" is not limited to the country information but may be information indicating an area broader than that of the country information or may be information indicating an area narrower than that of the country information (e.g., city).

(Fourteenth Modification) In the above embodiments, the processes of FIGS. 3 to 12 are implemented by a software (e.g., the program 136, 138), however, at least one of these processes may be implemented by hardware such as a logic circuit. In the present disclosure, the phrase "at least one of A, B, and C" means "(A), (B), (C), (A and B), (A and C), (B and C) or (A, B and C)".

What is claimed is:

1. A non-transitory computer-readable recording medium storing computer-readable instructions for a terminal device, wherein the terminal device comprises:
    a processor: and
    a display,
    wherein the computer-readable instructions, when executed by the processor, cause the terminal device to:
    receive first device identification information identifying a first communication device from the first communication device;
    send the first device identification information to a management server, wherein the management server is configured to store, for each of one or more device identification information, the device identification information and display related information in association with each other, the display related information which is related to display of notification information;
    receive first display related information associated with the first device identification information from the management server, the first display related information being sent from the management server in response to the first device identification information being sent to the management server;
    receive the notification information from a notification server;
    in a case where the first display related information indicates a predetermined information, display an object on the display, the predetermined information indicating that the first communication device identified by the first device identification information supports a predetermined service;
    in a case where the first display related information does not indicate the predetermined information, not display the object on the display; and
    in a case where an operation to the object displayed on the display is accepted, display notification related information related to the notification information on the display.

2. The non-transitory computer-readable recording medium as in claim 1, wherein the computer-readable instructions, when executed by the processor, further cause the terminal device to:
    receive second device identification information identifying a second communication device different from the first communication device from the second communication device;
    send the second device identification information to the management server; and
    receive second display related information associated with the second device identification information from the management server, the second display related information being sent from the management server in response to the second device identification information being sent to the management server,
    wherein in a case where at least one of the first display related information and the second display related information indicates the predetermined information, the object is displayed on the display, and
    in a case where neither the first display related information nor the second display related information indicates the predetermined information, the object is not displayed on the display.

3. The non-transitory computer-readable recording medium as in claim 1, wherein
    the first device identification information is repeatedly sent to the management server.

4. The non-transitory computer-readable recording medium as in claim 3, wherein
    in a first case where the first display related information previously received from the management server does not indicate the predetermined information and the first display related information currently received from the management server indicates the predetermined information, the object is displayed on the display.

5. The non-transitory computer-readable recording medium as in claim 4, wherein
    in the first case, the object having a first display manner is displayed on the display,
    in a case where the first display related information received from the management server indicates the predetermined information after the first case, the object having a second display manner different from the first display manner is displayed on the display, and
    the object having the first display manner is emphasized in comparison with the object having the second display manner.

6. The non-transitory computer-readable recording medium as in claim 3, wherein
    in a second case where the first display related information previously received from the management server indicates the predetermined information and the first display related information currently received from the management server does not indicate the predetermined information, the object is not displayed on the display.

7. The non-transitory computer-readable recording medium as in claim 6, wherein
    in the second case, a message indicating that the object is no longer displayed is displayed on the display.

8. The non-transitory computer-readable recording medium as in claim 1, wherein
    the management server is configured to store the first device identification information, first area information and the first display related information in association with each other, and is further configured to store the first device identification information, second area information and third display related information in association with each other, wherein the first device identification information and set-up area information indicating an area where the first communication device is set up are sent to the management server, in response to the first device identification information and the set-up area information which is the first area information being sent to the management server, the first display related information associated with the first device identification information and first area information is received from the management server, and in response to the first device identification information and the set-up area information which is the second area information are sent to the management server, the third display related information associated with the first device identification information and the second area information is received from the management server.

9. The non-transitory computer-readable recording medium as in claim 1, wherein
the notification related information is a list of one or more the notification information.

10. The non-transitory computer-readable recording medium as in claim 1, wherein
the notification related information is a selection screen for selecting whether or not to display the notification information.

11. A terminal device comprising:
a controller; and
a display,
wherein the controller is configured to:
receive first device identification information identifying a first communication device from the first communication device;
send the first device identification information to a management server, wherein the management server is configured to store, for each of one or more device identification information, the device identification information and display related information in association with each other, the display related information which is related to display of notification information;
receive first display related information associated with the first device identification information from the management server, the first display related information being sent from the management server in response to the first device identification information being sent to the management server;
receive the notification information from a notification server;
in a case where the first display related information indicates a predetermined information, display an object on the display, the predetermined information indicating that the first communication device identified by the first device identification information supports a predetermined service;
in a case where the first display related information does not indicate the predetermined information, not display the object on the display; and
in a case where an operation to the object displayed on the display is accepted, display notification related information related to the notification information on the display.

12. A method for controlling a terminal device, the method comprising:

receiving first device identification information identifying a first communication device from the first communication device;

sending the first device identification information to a management server, wherein the management server is configured to store, for each of one or more device identification information, the device identification information and display related information in association with each other, the display related information which is related to display of notification information;

receiving first display related information associated with the first device identification information from the management server, the first display related information being sent from the management server in response to the first device identification information being sent to the management server;

receiving the notification information from a notification server;

in a case where the first display related information indicates a predetermined information, displaying an object on a display of the terminal device, the predetermined information indicating that the first communication device identified by the first device identification information supports a predetermined service;

in a case where the first display related information does not indicate the predetermined information, not displaying the object on the display; and in a case where an operation to the object displayed on the display is accepted, displaying notification related information related to the notification information on the display.

13. The method according to claim 12, further comprising
receiving second device identification information identifying a second communication device different from the first communication device from the second communication device;
sending the second device identification information to the management server; and
receiving second display related information associated with the second device identification information from the management server, the second display related information being sent from the management server in response to the second device identification information being sent to the management server,
wherein in a case where at least one of the first display related information and the second display related information indicates the predetermined information, the object is displayed on the display, and
in a case where neither the first display related information nor the second display related information indicates the predetermined information, the object is not displayed on the display.

14. The method according to claim 12, wherein
the first device identification information is repeatedly sent to the management server.

15. The method according to claim 14, wherein
in a first case where the first display related information previously received from the management server does not indicate the predetermined information and the first display related information currently received from the management server indicates the predetermined information, the object is displayed on the display.

16. The method according to claim 15, wherein
in the first case, the object having a first display manner is displayed on the display,
in a case where the first display related information received from the management server indicates the predetermined information after the first case, the object having a second display manner different from the first display manner is displayed on the display, and the object having the first display manner is emphasized in comparison with the object having the second display manner.

17. The method according to claim 14, wherein in a second case where the first display related information previously received from the management server indicates the predetermined information and the first display related information currently received from the management server does not indicate the predetermined information, the object is not displayed on the display.

18. The method according to claim 17, wherein in the second case, a message indicating that the object is no longer displayed is displayed on the display.

19. The method according to claim 12, wherein the management server is configured to store the first device identification information, first area information and the first display related information in association with each other, and is further configured to store the first device identification information, second area information and third display related information in association with each other, wherein the first device identification information and set-up area information indicating an area where the first communication device is set up are sent to the management server, in response to the first device identification information and the set-up area information which is the first area information being sent to the management server, the first display related information associated with the first device identification information and first area information is received from the management server, and in response to the first device identification information and the set-up area information which is the second area information are sent to the management server, the third display related information associated with the first device identification information and the second area information is received from the management server.

20. The method according to claim 12, wherein the object is an object for displaying a list of one or more the notification information and an object for displaying a selection screen for selecting whether or not to display the notification information.

21. The method as in claim 12, wherein the notification related information is a list of one or more the notification information.

22. The method as in claim 12, wherein the notification related information is a selection screen for selecting whether or not to display the notification information.

* * * * *